Sept. 28, 1954     C. H. RICHARDS     2,690,247
AUTOMATIC STEP-SPEED POWER TRANSMISSION
Filed June 30, 1948     6 Sheets-Sheet 1
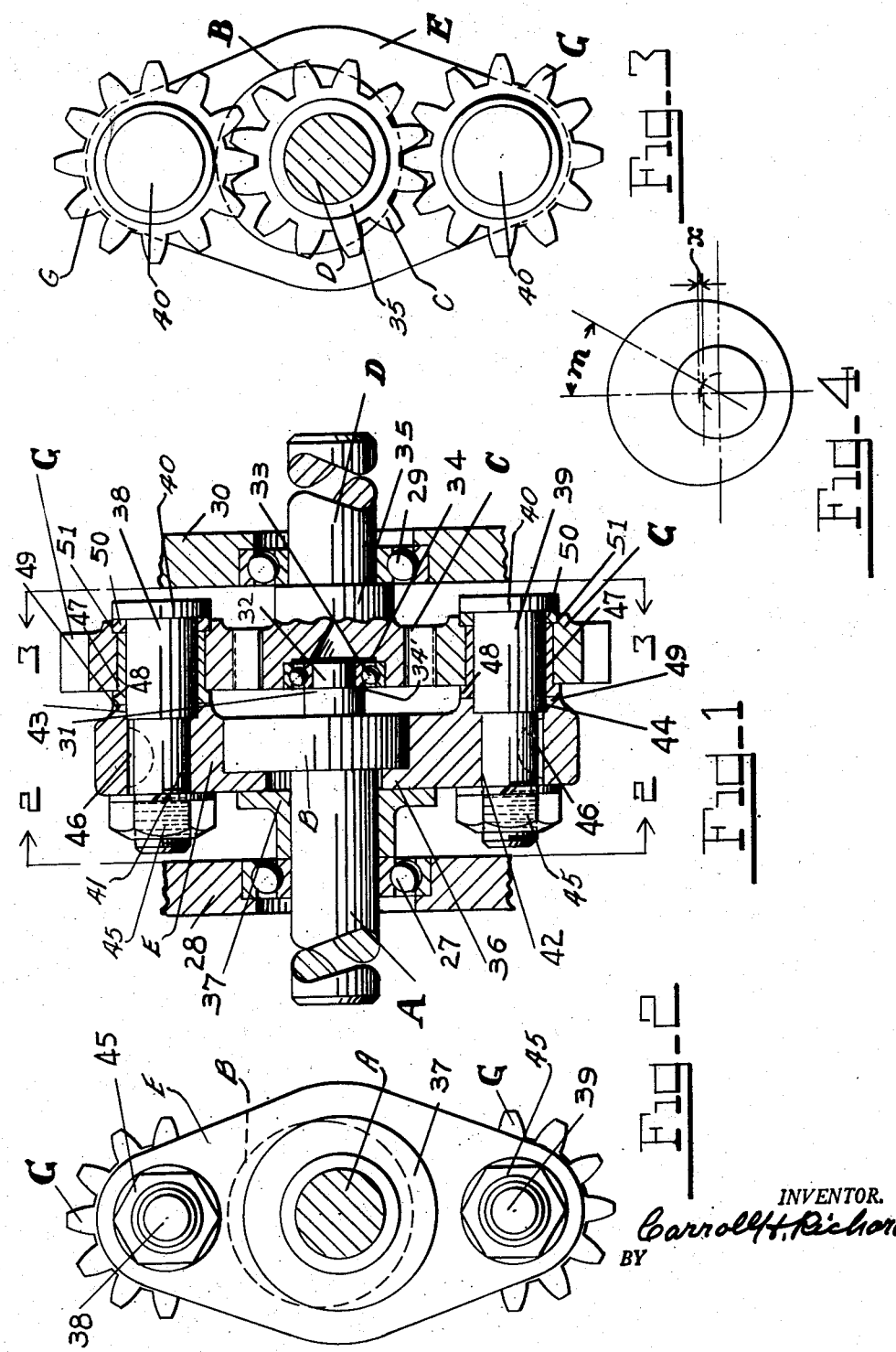
INVENTOR.
Carroll H. Richards
BY

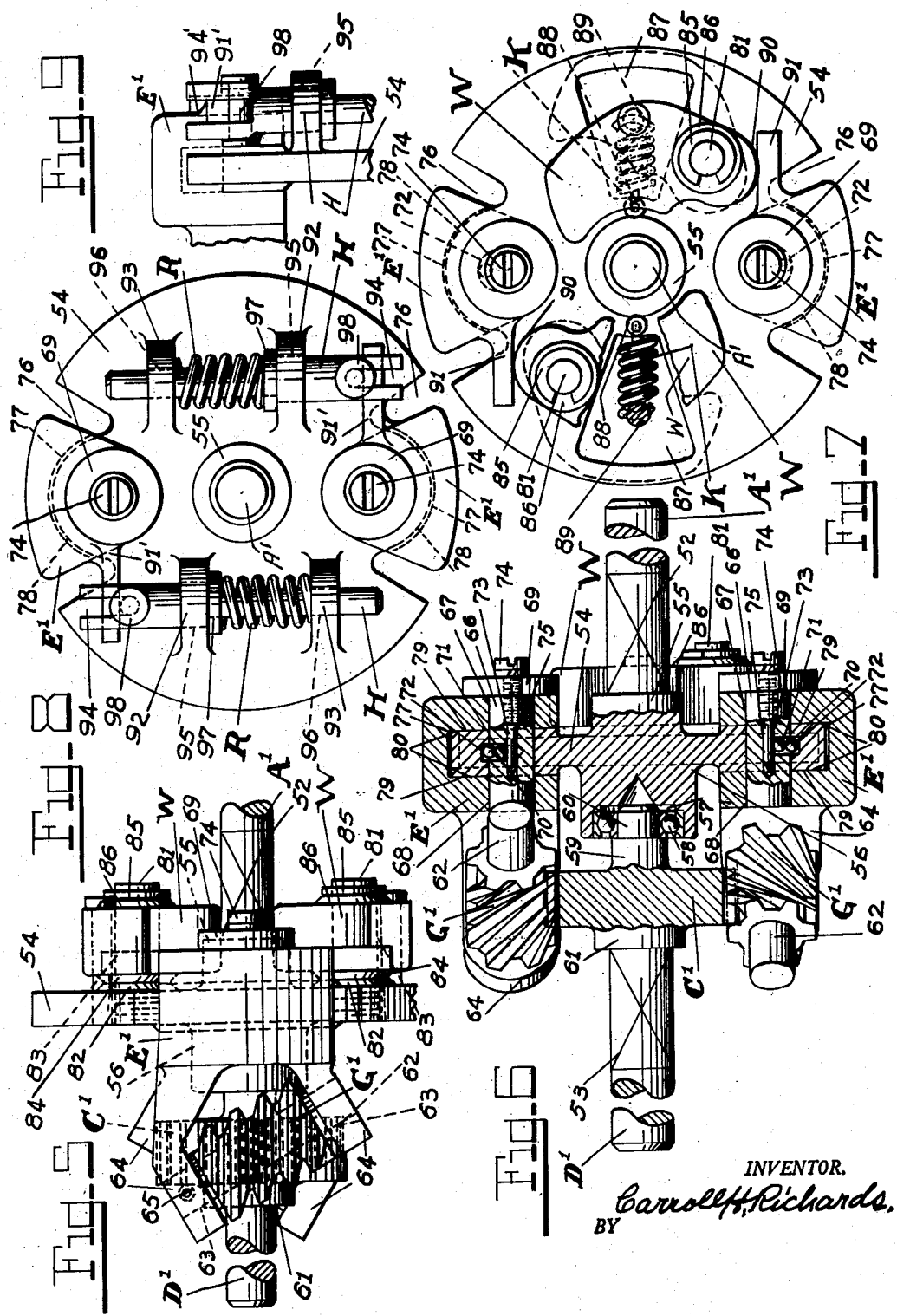

Sept. 28, 1954     C. H. RICHARDS     2,690,247
AUTOMATIC STEP-SPEED POWER TRANSMISSION
Filed June 30, 1948     6 Sheets-Sheet 3
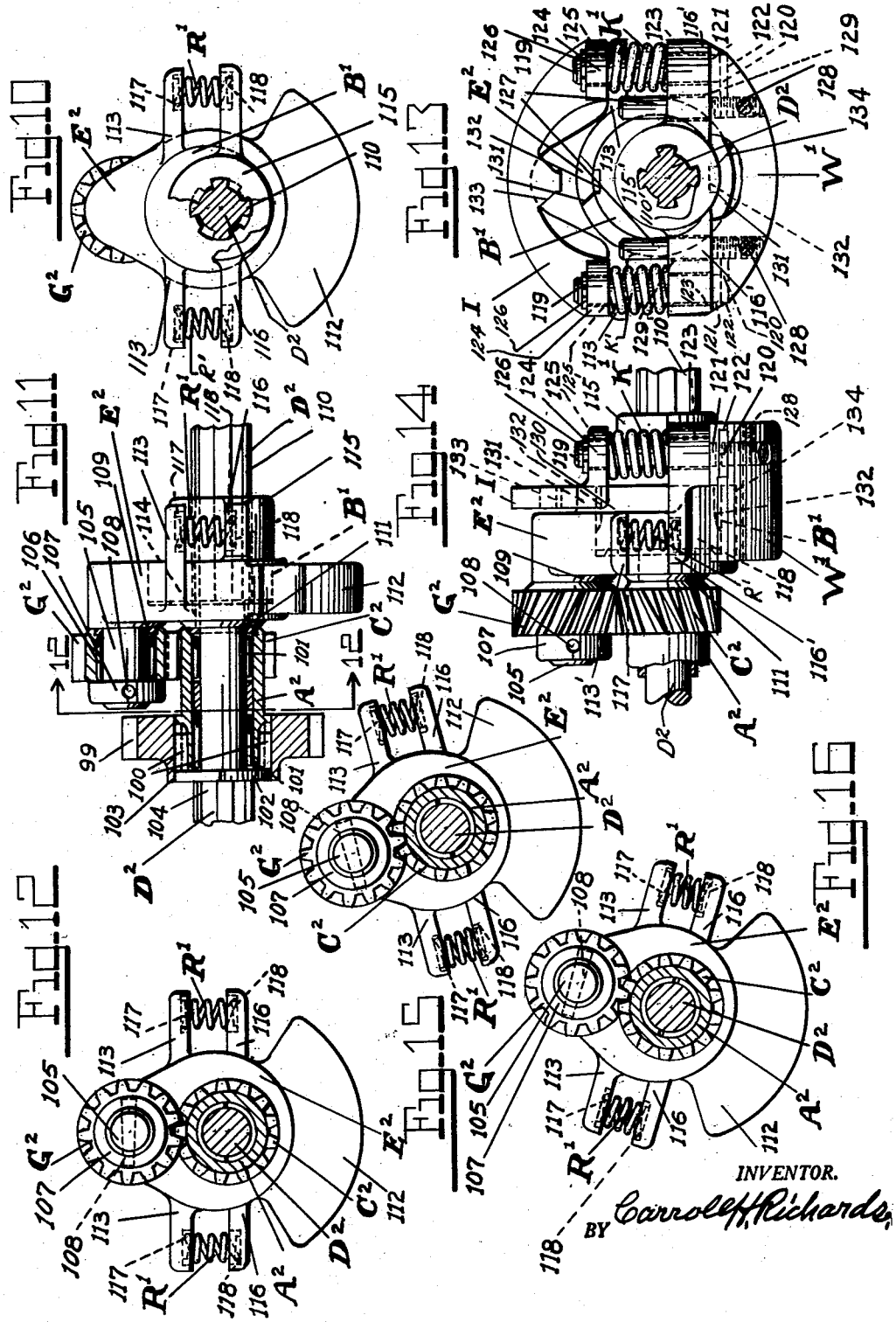
INVENTOR.
BY Carroll H. Richards

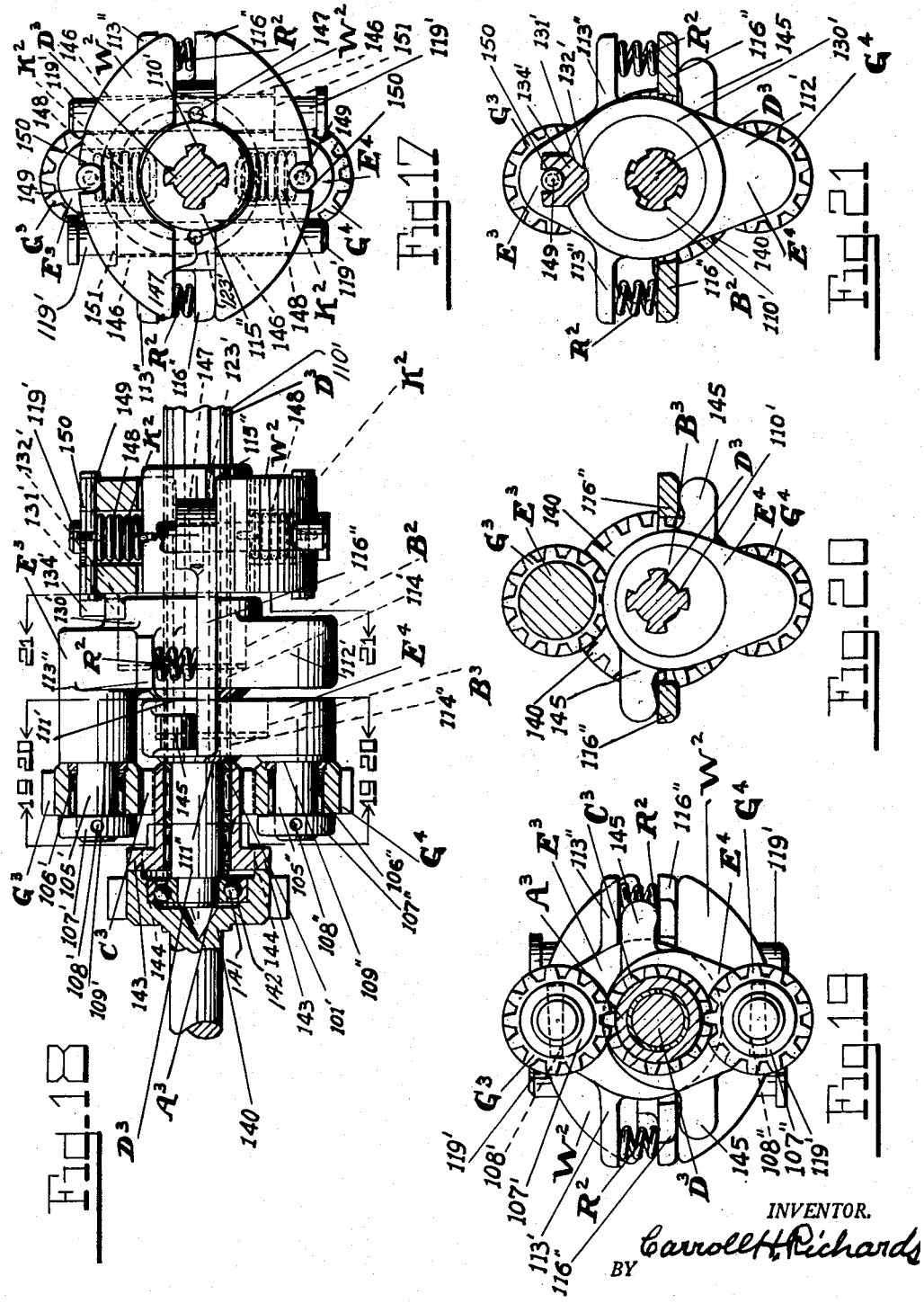

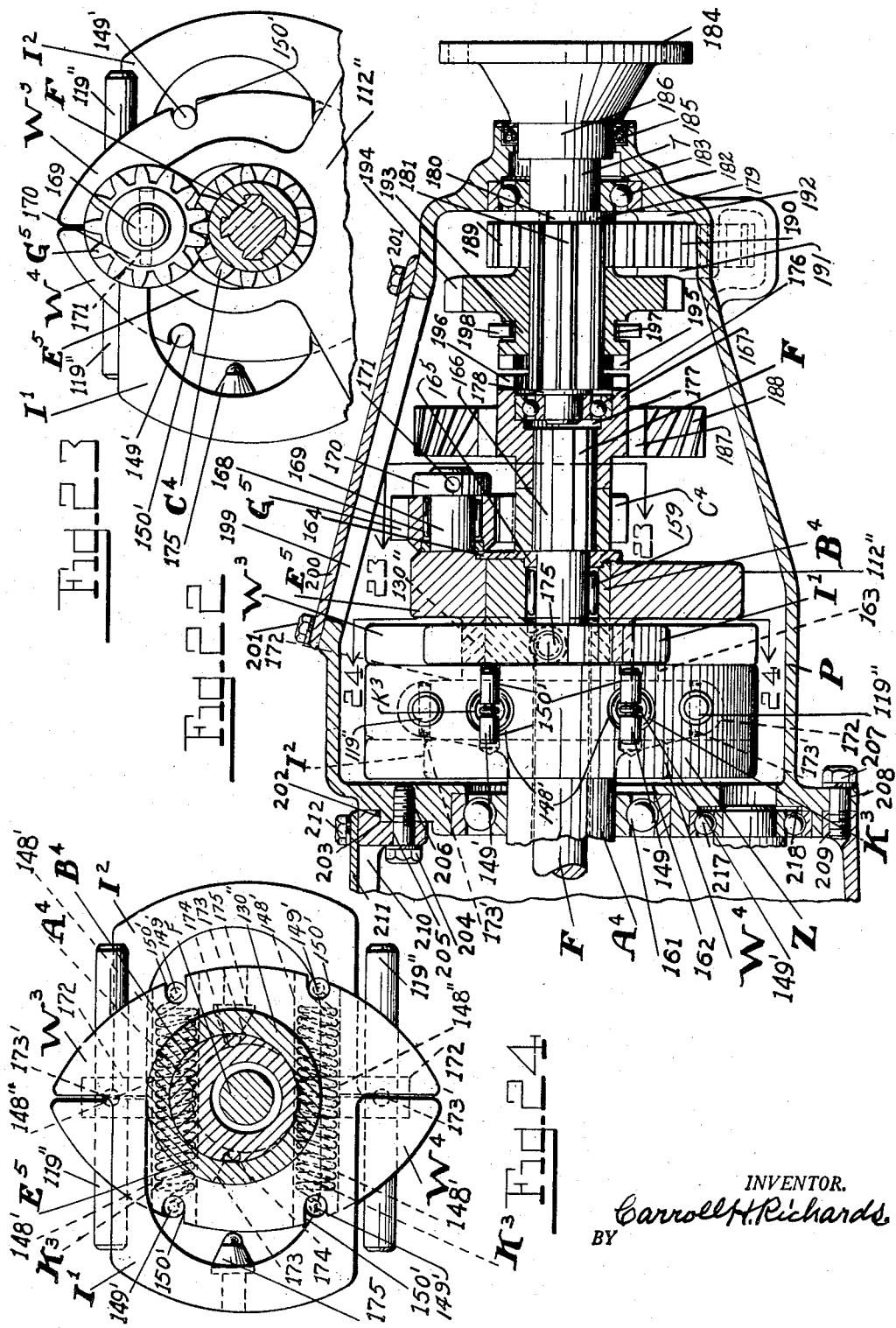

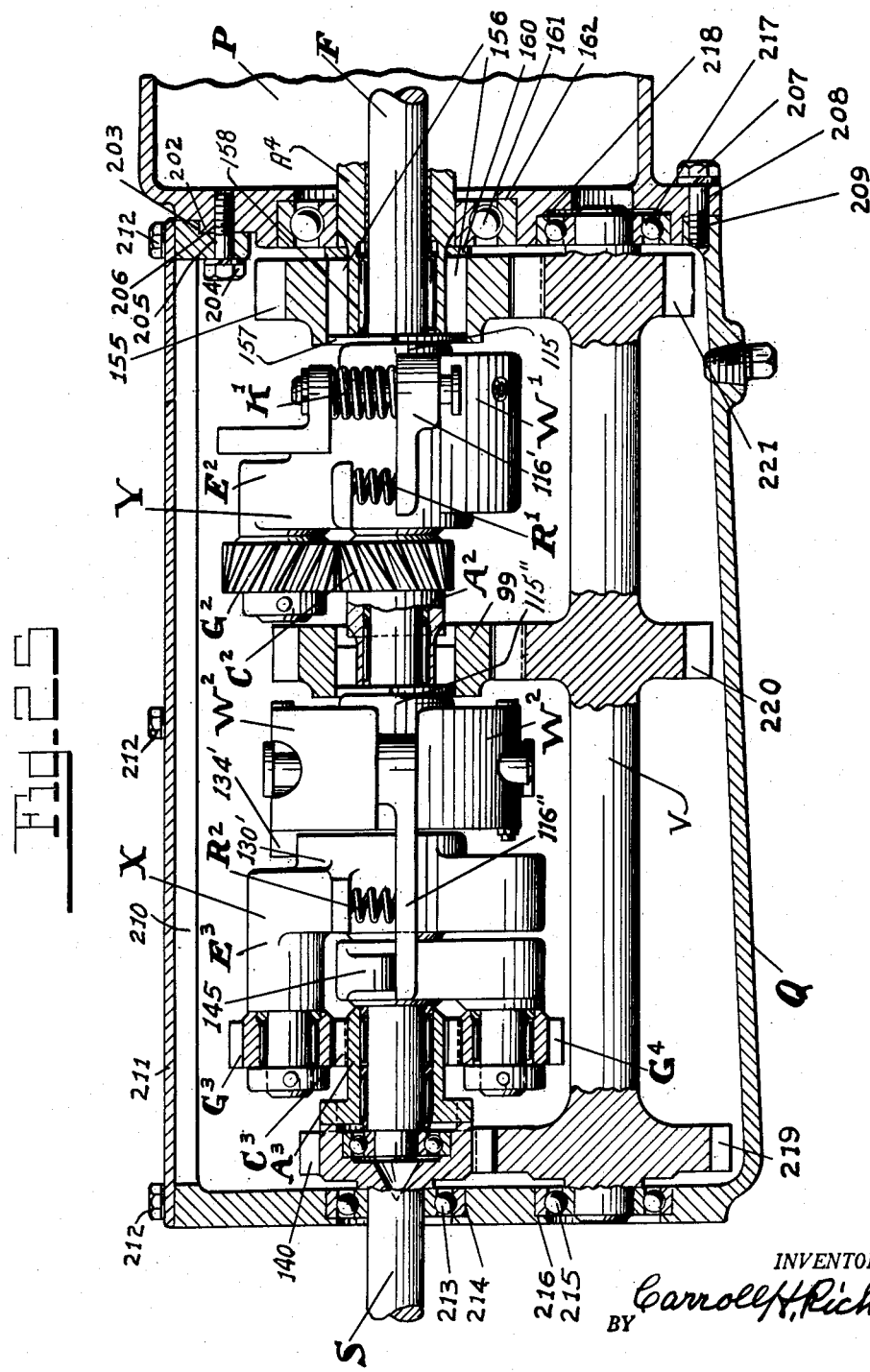

Patented Sept. 28, 1954

2,690,247

UNITED STATES PATENT OFFICE 2,690,247

AUTOMATIC STEP-SPEED POWER TRANSMISSION

Carroll H. Richards, Boston, Mass.

Application June 30, 1948, Serial No. 36,034

15 Claims. (Cl. 192—71)

This invention relates to new improvements in automatic step-speed power transmissions and particularly to that type of transmission that is both torque controlled and controlled by the speed of the final driven element. Such a transmission is disclosed in applicant's Patent No. 2,444,530.

The paramount objects of this invention are the simplifications of construction, the eliminating of all friction controls and the eliminating of the main clutch which heretofore was requisite in the performance of these transmissions. What is meant here by eliminating the main clutch is that the shifting mechanism for the low speed functions both as an automatic clutch and a shifting mechanism.

In this application the mechanism to simplify the construction is dominated by applicant's Patent No. 2,407,099 and pending application for patent Serial No. 671,089, filed May 20, 1946, now Patent No. 2,544,107, dated March 6, 1951. For the purpose of facilitating the description of the construction and performance of this invention, forms of construction of the Patent No. 2,407,099 and pending application for patent Serial No. 671,089 are disclosed in the drawings and described in this specification.

In the accompanying drawings:

Fig. 1 is a longitudinal section of a two-way overriding device, with some parts shown in elevation, in which all spur gears or helical gears of a small helical angle may be employed.

Fig. 2 is a section taken along line 2—2 in Fig. 1.

Fig. 3 is a section taken along line 3—3 in Fig. 1.

Fig. 4 is a diagrammatic view for the purpose of explaining the performance of the device.

Fig. 5 is an elevation of an automatic device centrifugally controlled.

Fig. 6 is a longitudinal section of the device shown in Fig. 5, with some parts in elevation.

Fig. 7 is an end view of the device shown in Figs. 5 and 6 when the device is centrifugally controlled.

Fig. 8 is an end view of the device shown in Figs. 5 and 6 when the device is controlled by spring tension only.

Fig. 9 is a detail of the spring tension control mechanism with parts broken away.

Fig. 10 is an end view of an intermediate speed shifting mechanism entirely torque controlled, with some parts shown broken away and in a non-driving position.

Fig. 11 is a longitudinal section of an intermediate speed shifting mechanism entirely torque controlled with some parts shown in elevation, some parts broken away and in a non-driving position.

Fig. 12 is a sectional view taken along line 12—12 in Fig. 11.

Fig. 13 is an end view of an intermediate speed shifting mechanism controlled by torque and by centrifugal force, with some parts broken away and shown in a non-driving position.

Fig. 14 is a side elevation of an intermediate speed shifting mechanism controlled by torque and centrifugal force, with some parts broken away and shown in a non-driving position.

Fig. 15 is a similar view to Fig. 12 and shows the relative positions of the parts when the mechanism is in a driving position, particularly as regards the gears and this applies to both entirely torque controlled and torque controlled and centrifugally controlled mechanisms.

Fig. 16 is a similar view to Fig. 12 and shows the relative positions of the parts when the mechanism is in hold-back position, particularly as regards the gears and this applies to both entirely torque controlled and torque controlled and centrifugally controlled mechanisms.

Fig. 17 is an end view of a high speed shifting mechanism, both torque and centrifugally controlled with the floating shaft in section.

Fig. 18 is a side view of a high speed shifting mechanism, both torque and centrifugally controlled with some parts in elevation and some parts in section.

Fig. 19 is a sectional view along line 19—19 in Fig. 18.

Fig. 20 is a sectional view along line 20—20 in Fig. 18.

Fig. 21 is a sectional view along line 21—21 in Fig. 18.

Fig. 22 is a side elevation with parts in section of the low speed shifting mechanism, which also functions as an automatic device, shown in the transmission housing which also houses the manually operated mechanism for making operative the conventionally known forward, neutral and reverse speeds.

Fig. 23 is a sectional view of the low speed shifting mechanism and automatic clutch taken along line 23—23 in Fig. 22 with parts broken away.

Fig. 24 is a sectional view of the low speed shifting mechanism and automatic clutch taken along line 24—24 in Fig. 22.

Fig. 25 is a longitudinal section of a stepspeed automatic power transmission showing a high speed shifting mechanism and an intermediate speed mechanism, both torque and centrifugally controlled with some parts in section and some parts in elevation.

Referring to the drawings Fig. 1 discloses a two-way overriding device in which A is the driving shaft and D is the driven shaft. Driving shaft A is journaled in ball bearing 27 conventionally held in housing 28 part of which is broken away and driven shaft D is journaled in ball bearing 29 conventionally held in housing 30 part of which is broken away. An eccentric B is integral with driving shaft A. Driving shaft A has two portions 31 and 32 of different diameters, portion 32 has the smaller diameter and is journaled in ball bearing 33 conventionally held in receptacle 34 of gear C which is integral with driven shaft D. A shoulder 34' formed by the portions 31 and 32 of driving shaft A, which have different diameters, abuts the inner ring of ball bearing 33. The end of hub 35 of gear C abuts the inner ring of ball bearing 29.

A member E fits over the cylindrical surface of eccentric B and is free to turn over this cylindrical surface. A lip 36 of member E projects inwardly and the inner surface of lip 36 movably abuts one side of the eccentric B and the outer surface of said lip movably abuts the inner end surface of spacer collar 37. Spacer collar 37 is free to rotate on driving shaft A and its outer end abuts the inner ring of ball bearing 27.

Shafts 38 and 39 have heads 40 at one end and are threaded at the other end. They each have two different diameters and the portions having the smaller diameters fit tightly into holes 41 and 42 in member E and part of their larger portions fit into counterbores 43 and 44 of holes 41 and 42 respectively. Shoulders formed by the portions of the different diameters are drawn tight against the bottoms of the counterbores 43 and 44 by tightening nuts 45 threaded on the ends of said shafts 38 and 39. Conventional lock washers under the nuts press against one side of member E and prevent the nuts from turning after they are tightened. Keys and key ways 46 prevent shafts 38 and 39 from turning in holes 41 and 42 of member E.

Bushings 47 fit tightly into gears G which are mounted on and free to rotate about the large portions of shafts 38 and 39. One side of flange portions 48 of bushings 47 movably abut the ends of bosses 49 of member E and the other side of flange portions 48 fit tightly against one of the sides of the gears G. Washers 50 fit into counterbores 51 of the gears G and the outer flat surfaces of washers 50 movably abut the inner flat surfaces of heads 40 of shafts 38 and 39. Gears G mesh with gear C and only one of the gears G takes the load, the other gear functions only as a counterbalancing weight, which will be more fully explained in the description of the performance of this mechanism.

If the driving shaft A be rotated in either direction of rotation, and the driven shaft D be at rest, eccentric B integral with shaft A will cause member E to be pulled downward as viewing Fig. 1. This movement of member E will pull the top gear G downward and either the top of a tooth of gear G will contact the bottom of a tooth space of gear C or a top of a tooth of gear C will contact the bottom of a tooth space of gear G depending on the relative positions of the gears G and C at the time the rotation of shaft A started. This movement of member E would cause the top of a tooth of gear G to contact the bottom of a tooth space of gear C if the relative positions of gears G and C were as shown in the drawings. If the rotation of driving shaft A continues after the top of a tooth of one of the gears G or C has contacted the bottom of a tooth space of one of the gears G or C, gear C and gear G will be locked together and gear C which is integral with driven shaft D will rotate at the same speed as driving shaft A, or in other words the entire mechanism will rotate bodily. It is obvious that the greater the driving torque of driving shaft A and the greater the resistance offered by driven shaft D in direct proportion the greater the pressure of a top of a tooth of one of said gears on the bottom of a tooth space of the other of said gears. It will also be noted that when one of said gears G is moved toward the common axis of rotation of the driving and driven shaft A and D respectively, that the other of said gears G is moved outwardly and away from this said common axis of rotation, carries no load and only functions as a counterbalancing member and a counterbalancing member other than a gear could replace it. Since it is intended to employ spur or helical gears of a small helical angle in this construction the center of rotation of member E must be spaced (as defined in applicant's Patent No. 2,407,099) close to the common axis of rotation of the driving and driven shafts A and D respectively, and to secure strength and inexpensive construction when the offset center is close to the common center of rotation, the conventional eccentric is employed which has been the solution to problems of this nature since practically the birth of mechanisms.

In Fig. 4 the angle $m$ is equivalent to substantially the travel of one tooth and tooth space of the gears shown in the drawings. The distance $x$ is substantially the distance this angular travel $m$ of the eccentric B would pull the gear G toward the common axis of rotation of the driving and driven shafts A and D respectively. It is obvious that this distance $x$ is much greater than the distance required to cause a locking of gears and it follows that the gears can be locked in a much less travel than that of one tooth.

If the driven shaft D be rotated in either direction of rotation and the driving shaft A be at rest, gear C, integral with driven shaft D, meshes with gears G and gears G will be rotated in the opposite direction to the direction of rotation of gear C. Due to this rotation just described, gears G will be forced outward away from the common axis of rotation of the driving and driven shafts A and D and this outward movement depends on the pressure angle of the gears, the greater the pressure angle the greater the force, to force the gears apart. So if driven shaft D rotates gear C in either direction of rotation there will be no appreciable drive transmitted through gears G, member E and eccentric B to driving shaft A.

So it follows if driving shaft A rotates faster in either direction of rotation than driven shaft D is rotating, that there will be a lockup of the gearing and driven shaft D will rotate at the same speed as driving shaft A. But if driven shaft D rotates faster in either direction of rotation than driving shaft A, it can continue rotating faster in either direction of rotation, gears G will idle about their shafts 38 and 39 and there will be no appreciable driving force transmitted by driven shaft D and gear C through gears G, member E and eccentric B to driving shaft A.

Referring to the drawings, Figs. 5, 6, 7, 8 and 9 disclose two designs of automatic devices, controlled by the speed of one of its elements, one by spring tension alone and the other by centrifugal force of revolving weights working against spring tension and these mechanisms are claimed in applicant's pending application Serial No. 671,089, filed May 20, 1946. Driving shaft $A^1$ is journaled in indicated bearing 52 and driven shaft $D^1$ is journaled in indicated bearing 53. A disc 54 is integral with driving shaft $A^1$ and hubs 55 and 56 are integral with the disc 54. The outer end of hub 55 movably abuts indicated bearing 52. Hub 56 has a receptacle 57 in which is conventionally held ball bearing 58.

Driven shaft $D^1$ at its inner end has two portions of different diameters 59 and 60 the smaller of the two is journaled in ball bearing 58 held in receptacle 57 in the hub 56. The shoulder formed by the difference in diameters of the portions 59 and 60 of driven shaft $D^1$ abuts the inner ring of ball bearing 58.

Spur gear $C^1$ is integral with driven shaft $D^1$ and has a hub 61, the outer end of which movably abuts the indicated bearing 53. Helical gears $G^1$ mesh with spur gear $C^1$, are mounted on and are free to rotate about fixed shafts 62, which fit into holes 63 in bifurcations 64 of members $E^1$ and located and prevented from turning in holes 63 by tapered pins 65 which pierce the bifurcations 64 and one of the ends of the shafts 62. Members $E^1$ are free to turn about fixed shafts 66, which fit into holes 67 and 68 of members $E^1$ and have heads 69 at one of their ends, the inner surfaces of heads 69 movably abut a surface of members $E^1$ (see Fig. 6). Fixed shafts 66 are located longitudinally and prevented from turning by two balls 70, one set of these balls fit partially in holes 71 in the shafts 66 and partially into slots 72 circular in form in the disc 54 (see Fig. 7). The other set of balls fit entirely in holes 71 contact the other set of balls and pins 73. Pins 73 are a plain surface portion of screws 74 and fit into holes 75 in the center of shafts 66. Screws 74 are threaded in holes in the center of fixed shafts 66 and conventional lock washers are located under the heads of screws 74 and contact the outer surface of the heads of fixed shafts 66 and prevent the screws 74 from turning when they are tightened in their threads.

Members $E^1$ straddle the disc 54 in notches 76 and have inner cylindrical surfaces 77 which are adapted to turn over cylindrical surfaces 78 of the disc 54, which are formed in the notches 76. Inner surfaces 79 of members $E^1$ accurately fit movably on raised surfaces 80 of the disc 54.

Pins 81 are threaded in disc 54 and the bosses 82, are keyed in the disc 54 (keys and keyways are not shown), to prevent the pins 81 from turning (see Figs. 5 and 7), and are adapted to fit into holes 83 in weights W. The faces of bosses 84 of the weights W movably fit onto the faces of bosses 82 of the disc 54 and the weights W are free to rotate about the pins 81. Spring rings 85 are movably contacted on one of their sides by the faces of bosses 86 of the weights W, fit into grooves of the pins 81 and locate and hold the weights W on pin 81.

Apertures 87 in disc 54 house springs K, one of the ends of springs K are fastened to disc 54 near its hub 55 by the ends of said springs having hooks which fit into holes in the disc 54 and holes in washers 88 (see Fig. 7). The other ends of springs K are hooked through holes in pins 89 which movably fit into holes in the weights W and have heads on their ends opposite the ends to which the springs K are fastened. The springs K being fastened to one end of pins 89 and the heads of their other ends locate and hold the pins 89 in weights W. Cam surfaces 90 of weights W contact the inner surfaces of arms 91 integral with members $E^1$. When the weights W are at the nearest point of travel toward the common axis of rotation of the driving and driven shafts $A^1$ and $D^1$ respectively, members $E^1$ cannot rotate about the fixed shaft 66 in a counterclockwise direction as viewing Fig. 7, but when the weights W move outward due to centrifugal force away from the common axis of rotation of the said shafts, after a predetermined amount of travel outwardly, the cam surfaces 90 move away from the inner surfaces of arms 91 of members $E^1$ and the members $E^1$ will be permitted to rotate about the fixed shafts 66 until the predetermined limit of this counterclockwise rotation is reached.

In the above description the control of the movement of members $E^1$ about the fixed shaft 66 by weights and springs has been described. The following is a description of the control of the movement of the members $E^1$ about their fixed shaft 66 by springs alone. The design of the automatic device disclosed in Figs. 8 and 9 is exactly the same in construction as the device construction shown in Figs. 5 and 6 which has been described, except that springs R replace both the weights W and springs K (see Fig. 8).

In Fig. 8 lugs 92 and 93 are integral with the disc 54. Rods H have two different diameters and two slots at right angles to each other 94 and 94' at the ends of the said rods having the larger diameters. The larger diameter portions of rods H fit slidably into holes 95 in lugs 92 and the smaller diameter portions of rods H fit slidably in holes 96 in lugs 93. Washers 97 fit tightly on the smaller portion of rods H and tightly up against the shoulders formed by the said two different diameters of the rods H. Springs R press against the inside surfaces of lugs 93 and against the inside surfaces of washers 97 and encircle the small diameter portions of the rods H. The outside diameters of washers 97 being larger than holes 95 in lugs 92, enable springs R to hold washers 97 tightly against the inside surfaces of lugs 92. Rollers 98 have heads on each of their ends, fit into slots 94 of the rods H and are located longitudinally in slots 94 by the heads at each of their ends. Arms 91' integral with members $E^1$ fit into slots 94' of rods H contact rollers 98 and it is obvious that members $E^1$ cannot rotate about their fixed shafts 66 in a counterclockwise direction as viewing Fig. 8 without compressing springs R.

To describe the performance of the automatic device shown in Figs. 5, 6 and 7, assume the drive shaft $A^1$ is rotating in a clockwise direction as viewing Fig. 7, that the speed is not sufficient to cause the weights W due to centrifugal force to start to move outwardly away from their innermost position and that driven shaft $D^1$ and spur gear $C^1$ integral with shaft $D^1$ are at rest. Disc 54 integral with driving shaft $A^1$ will rotate with shaft $A^1$ and carry members $E^1$ with it. Helical gears $G^1$ carried in the bifurcations 64 of members $E^1$ and meshing with gear $C^1$ at rest will idle about their fixed shafts 62 as they are carried around gear $C^1$ and there will be no appreciable driving force imparted to gear $C^1$ but there will be a tendency for members $E^1$ to turn about their fixed shaft 66 in a counterclockwise direction as viewing Fig. 7 but this is prevented by arm 91 contacting cam surfaces 90 of the weights W. Assuming now the speed of the driving shaft $A^1$ is gradually increased, the weights W start to move outwardly and the gears $G^1$ idle faster, the cam surfaces 90 move away from the inner surfaces of arms 91, permitting the members $E^1$ to move in a counterclockwise direction as viewed in Fig. 7 due to the faster idling of gears $G^1$ and their tilted positions and a certain amount of driving force is transmitted to the gear $C^1$ and the driven shaft $D^1$ which is integral with gear $C^1$. This part of the performance is analogous to the performance of a slipping device and automatically secures smooth starting. As the speed of the driving shaft $A^1$ continues to increase the weights W move farther outwardly, the members $E^1$ turn farther in a counterclockwise direction, the slipping device performance continues and the driving force imparted by gears $G^1$ to driven gear $C^1$ increases with the speed of driving shaft $A^1$. This slipping device performance continues until the speed of the driving shaft $A^1$ has increased to cause the weights W to have travelled to a point that has caused the cam surfaces 90 to be just out of contact with the inner surfaces of arms 91 at which time the members $E^1$ have turned in a counterclockwise direction as viewing Fig. 7 so that the tops of the teeth of one or the other of gears $G^1$ or $C^1$ have contacted the bottom of the tooth spaces of the other, the device is engaged and the driven shaft $D^1$ must rotate at the same speed as the driving shaft $A^1$. By inspection of the drawings it will be seen that if the driven shaft $D^1$ should attempt to rotate faster in the same direction of rotation than driving shaft $A^1$ is rotating after the device is fully engaged as just described, the device will remain engaged since the tendency would be to cause the members $E^1$ to rotate in a counterclockwise direction. But if either the driving shaft $A^1$ or the driven shaft $D^1$ should start to rotate in a counterclockwise direction as viewing Fig. 7 faster than the other, the members $E^1$ would turn in a clockwise direction as viewing Fig. 7 and there would be nothing to prevent a complete engagement by the tops of the teeth of one of said gears contacting the bottoms of the tooth spaces of the other.

To describe the performance of the automatic clutch shown in Figs. 5, 6 and 8 assume that the driving shaft $A^1$ rotates in a clockwise direction as viewing Fig. 8 and gradually increases in speed. When the speed is at a predetermined low speed the resistance of the springs R will be such that they will not be appreciably compressed by pressure of the arms 91' on the rollers 98, caused by the helical gears $G^1$ idling as they are carried about driven gear $C^1$ which causes or tends to cause members $E^1$ to rotate in a counterclockwise direction as viewing Fig. 7. But as the speed of the driving shaft $A^1$ increases this idling of gears $G^1$ and their tilted positions permitted as the springs R are compressed, cause the springs R to be compressed more and more as the speed increases by causing the members $E^1$ to rotate farther counterclockwise. This motion is transmitted through arms 91', to rollers 98, to rods H and then to the springs R. As these springs R are compressed as the speed increases the slipping performance as described in the foregoing continues, until the rotations of members $E^1$ rotate counterclockwise, as viewing Fig. 8, to a point where the tops of the teeth of gears $G^1$ or gear $C^1$ contacts the bottoms of the tooth spaces of the other and complete engagement of the parts is established and remain established as long as the speed necessary to cause the engagement is maintained or increases. The performance of this design of automatic device other than that performance just described is exactly the same as the performance of the first described design of the automatic device.

The foregoing description of the construction and performance of devices contributes to a better understanding of the description of the constructions and performances of the shifting mechanisms that follows. Parts of the shifting mechanisms that function the same as parts of the devices have the same basic reference characters as nearly as possible. Referring to the drawings, Figs. 10, 11 and 12 disclose a torque controlled shifting mechanism in which $A^2$ is a hollow driving shaft and $D^2$ is the driven shaft. Bearings are not shown for the driven shaft $D^2$ as this mechanism would be located in the mid-portion of a step-speed power transmission and the shaft designated as driven shaft $D^2$ would be the floating shaft journaled near each end of the transmission. All driven shafts of the shifting mechanism shown and described as isolated units in this specification are referred to and considered in this manner.

A gear 99, which would receive the driving power from a gear on the countershaft of a transmission, is keyed to hollow driving shaft $A^2$ by key and keyways 100, and is mounted on driven shaft $D^2$ and free to rotate about the said shaft on needle bearings 101 entailing the usual conventional construction. Conventional split ring 102 fits on driven shaft $D^2$, into counterbore 103 of gear 99, abuts the ends of splines 104 on the driven shaft $D^2$ and movably abuts the bottom of counterbore 103 and the end of hollow driving shaft $A^2$. The other end of hollow shaft $A^2$ movably abuts the face of boss 111 of member $E^2$.

Gear $C^2$ is integral with driving shaft $A^2$ and meshes with gear $G^2$ mounted on fixed shaft 105 integral with member $E^2$ and is free to rotate about fixed shaft 105 on needle bearing 106 entailing the usual conventional construction. A collar 107 fits on the outer end of fixed shaft 105 and is held in place by tapered pin 108 which pierces both the fixed shaft and collar. One end of gear $G^2$ movably abuts the inside surface of collar 107 and the other end of gear $G^2$ movably abuts the face of boss 109 of the member $E^2$.

Member $E^2$ is mounted on and free to rotate about eccentric $B^1$. Eccentric $B^1$ is loosely splined on driven shaft $D^2$ and has a limited movement in either direction of rotation without establishing a driving connection between the eccentric $B^1$ and the shaft $D^2$ (see Fig. 10). The reason for this limited movement is to facilitate the establishing of a driving connection between the driving shaft $A^2$ and driven shaft $D^2$ more fully explained in the description of the performance of the mechanism.

Counterbalancing weight 112 and arms 113 are integral with member $E^2$. A plain portion of driven shaft $D^2$ loosely pierces hole 114 in member $E^2$, and one end of eccentric $B^1$ movably abuts the face of a boss which is integral with member $E^2$, and is shown in broken lines and encircles hole 114. The other end of eccentric $B^1$ abuts the inner end of collar 115 splined to driven shaft $D^2$ in splines 110. Arms 116 are integral with collar 115.

Springs $R^1$, under predetermined compression, have their seats in recesses 117 and 118 in arms 113 and 116 of member $E^2$ and collar 115 respectively. This terminates the description of the construction of an entirely torqued controlled speed shifting mechanism. The outer end of collar 115 would abut normally a split ring similar to split ring 102 with the usual conventional construction. These two split rings would locate the shifting mechanism on the driven shaft $D^2$ longitudinally. In a step-speed power transmission construction, driven shaft $D^2$ would be the floating shaft of the transmission which will be more fully explained in the part of this specification that follows. This speed shifting mechanism just above described would be particularly adapted for the intermediate speeds of a step-speed power transmission.

The following is a description of an intermediate or low-speed shifting mechanism both torque and centrifugally controlled (see Figs. 13 and 14). A collar 115' is splined to shaft $D^2$ in splines 110' and arms 116' are integral with collar 115'. Weight $W^1$ replaces counterbalancing weight 112 described in the foregoing, and is adapted to move toward and away from the common axis of rotation of the driving shaft $A^2$ and driven shaft $D^2$ and this movement is controlled by springs $K^1$ and the centrifugal force acting on the weight $W^1$ when the said weight is revolved about the said common axis of rotation.

Rods 119 have feet 120 partially circular in form integral with the rods and the circular portions are larger than the rods. Two slots 121 and 122 in each side of the weight $W^1$ are adapted to receive the rods 119 and feet 120 respectively and rods 119 are attached to weight $W^1$ in this manner. Rods 119 slidably fit into holes 123 in arms 116'. Springs $K^1$ encircle rods 119 and have seats on the inner surfaces of arm 116'.

A yoke I has lugs 124 integral with it in which are holes 125. The inner surfaces of lugs 124 form seats for springs $K^1$ and the ends of rods 119 fit tightly into holes 125. Conventional spring ring and groove constructions 126 on the ends of rods 119 hold the lugs 124 on the said rods and the seats of springs $K^1$ on lugs 124 are held tightly against the springs $K^1$ which are under a predetermined compression. Guide rods 127 are threaded in weight $W^1$ and are further secured to weight $W^1$ by set screws 128 threaded in holes in the sides of weight $W^1$ and partially pierce guide rods 127. Guide rods 127 fit slidably into holes 129 of the arms 116'.

A hub 130 of member $E^2$ has notches 131 whose sides are sloping and slope inwardly toward each other. The narrow ends of these notches 131 are adapted to register with the sides of slots 132 rectangular in section and cut in the eccentric $B^1$. Notches 131 of the hub 130 are diametrically opposite each other and the slots 132 of the eccentric $B^1$ are also diametrically opposite each other. Projection 133 integral with the yoke I is adapted to fit accurately into one set of notches 131 and slots 132 and projection 134 of the weight $W^1$ is adapted to fit accurately into the other set of notches 131 and slots 132, when the said notches and slots register and at times during the performance of the mechanism, when the projection 133 is forced to fit into one set of said notches and slots due to the action of centrifugal force on the weight $W^1$ or when the projection 134 of the weight $W^1$ is forced to fit into the other set of notches and slots by springs $K^1$ the mechanism becomes inoperative, which will be more fully explained in the description of the performance of the mechanism.

The following is a description of the performance of an entirely torque controlled speed shifting mechanism (see Figs. 10 and 11). Driving shaft $A^2$ receives the driving force from gear 99 keyed to shaft $A^2$. In a step-speed power transmission gear 99 would receive the driving force from a gear on the countershaft which would mesh with gear 99. Gear $C^2$ is integral with driving shaft $A^2$ and meshes with gear $G^2$ free to rotate about the fixed shaft 105 integral with member $E^2$. Member $E^2$ is free to rotate about eccentric $B^1$ loosely splined on driven shaft $D^2$. Collar 115 splined to driven shaft $D^2$ has arms 116 integral with it and springs $R^1$ are under predetermined compression between arms 116 and arms 113 integral with member $E^2$.

Assuming that gear $C^2$ and gear $G^2$ are in relative positions to each other as disclosed in Fig. 12 and that these same relative positions are had in Fig. 10. If the gear $G^2$ be relatively at rest in respect to gear $C^2$, and if the driving and driven shafts $A^2$ and $D^2$ respectively rotate in the same direction, then if shaft $D^2$ rotates in a clockwise direction as viewed in Fig. 10, shaft $A^2$ will rotate in a counterclockwise direction as viewed in Figs. 12, 15 and 16 and if shaft $D^2$ starts to rotate faster than shaft $A^2$, member $E^2$ will be rotated through arms 116, springs $R^1$ and arms 113 causing the parts of the mechanism to take up the relative positions as shown in Fig. 15, at which time a top of a tooth of gear $G^2$ will contact the bottom of a tooth space of gear $C^2$. A driving connection is established between the driving shaft $A^2$ and driven shaft $D^2$ as disclosed in Fig. 15. During the movement of shaft $D^2$ just described, it had broken contact with the splines of the eccentric $B^1$ (see Fig. 10) and its splines have not contacted the splines of the eccentric $B^1$ ahead of it in its direction of travel, the spacing of the splines being made so that a driving connection is established before the splines of the shaft $D^2$ and the splines of eccentric $B^1$ make another contact in the direction shaft $D^2$ was moving. If at this point gear $C^2$ rotates faster than driven shaft $D^2$ is rotating the lockup of the gears as shown in Fig. 15 would be maintained and driving shaft $A^2$ would drive driven shaft $D^2$ through the gears $C^2$ and $G^2$ locked up and member $E^1$ and eccentric $B^1$. The splines of driven shaft $D^2$ and splines of eccentric $B^1$ would again contact each other as disclosed in Fig. 10 as long as driving shaft $A^2$ continued to drive driven shaft $D^2$.

However if the driven shaft $D^2$ continued to rotate faster than the driving shaft $A^2$ after the driving connection was established as shown in Fig. 15, then the splines of the shaft $D^2$ would contact the splines of eccentric $B^1$ in the direction shaft $D^2$ was moving, causing the eccentric $B^1$ to be driven in a clockwise direction as viewing Fig. 10 and a counterclockwise direction as viewing Figs. 12, 15, and 16 and a lockup of the gears would be had as disclosed in Fig. 16, and a driving connection would be established between the driving shaft $A^2$ and driven shaft $D^2$ in which the driven shaft $D^2$ would attempt to drive driving shaft $A^2$ in the same direction as the drive. In an automotive vehicle transmission, this would be a hold back speed.

It is obvious from the foregoing that to establish a driving connection to cause driving shaft $A^2$ to drive driven shaft $D^2$ or to establish a driving connection to cause shaft $D^2$ to drive shaft $A^2$, that the shafts $A^2$ and $D^2$ must be in some proximity of synchronism and that this proximity is determined by the strength of the springs $R^1$. If the reverse torque driving driven shaft $D^2$ was of such a magnitude as to drive shaft $D^2$ exceedingly fast, and the springs $R^1$ comparably stiff there would be no driving connections established as the actual time of synchronism would be so small that member $E^2$ carrying gear $G^2$ would be rotating so much faster than gear $C^2$ that gear $G^2$ would idle over gear $C^2$ as the springs $R^1$ would be compressed and member $E^2$ would not be rotated.

When coming from a lower speed to a higher one, that is when driven shaft $D^2$ would be increasing speed to equal the speed of shaft $A^2$ when shaft $A^2$ is rotating faster; if driven shaft $D^2$ is not rotating too fast under which condition no driving connection would be established as was just pointed out, the driving connection that must be established first is the one in which the driving shaft $A^2$ can drive the driven shaft $D^2$.

When there is no driving connection between shafts $A^2$ and $D^2$, if shaft $A^2$ is rotating faster than shaft $D^2$, gear $G^2$ idles in one direction of rotation and if shaft $D^2$ is rotating faster than shaft $A^2$ gear $G^2$ idles in the opposite direction of rotation.

If driven shaft $D^2$ is rotating faster than shaft $A^2$ in the direction of the drive and slows down to a speed slightly slower than shaft $A^2$ is rotating, the relative positions of the splines of shaft $D^2$ and the splines of the eccentric $B^1$ will be as shown in Fig. 10 and the relative rotation of eccentric $B^1$ to the member $E^2$ will be in a counter-clockwise direction and cause a lockup of the gears $G^2$ and $C^2$ as shown in Fig. 15 and shaft $A^2$ can drive shaft $D^2$ at the speed shaft $A^2$ is rotating. This performance will be more fully explained in the description of the performance of a step speed power transmission which follows in this specification.

The speed shifting mechanism disclosed in Figs. 13 and 14 is exactly like the speed shifting mechanism disclosed in Figs. 10 and 11 with the exception of the centrifugal control mechanism which is added to the mechanism disclosed in Figs. 10 and 11. This centrifugal control mechanism consists of the weight $W^1$ attached to rods 119, which slidably fit into holes 123 in arms 116'. Also attached to rods 119 is a yoke I which has lugs 124.

Springs $K^1$ encircle the rods 119 and have their seats on the inner surfaces of lugs 124 and arms 116'. The springs $K^1$ normally are compressed a predetermined amount. Yoke I and weight $W^1$ have projections 133 and 134 respectively, which are diametrically opposite to each other and are exactly alike in form. These projections 133 and 134 are adapted to fit into notches 131 of the hub 130 of the member $E^1$ and slots 132 of the eccentric $B^1$ when the notches 131 and slots 132 register all of which has been explained in detail in the foregoing.

When the driven shaft $D^2$ is at rest and until it has attained a predetermined speed the projection 134 fits into a notch 131 and a slot 132 and locks the hub 130 of member $E^2$ and the eccentric $B^1$ together, and thereby permitting no relative movement of the member $E^2$ and eccentric $B^1$. Since there can be no relative movement of the eccentric $B^1$ and member $E^2$, the shifting mechanism is inoperative and the springs $K^1$ hold the projection 134 in a notch 131 and slot 132.

After the shaft $D^2$ has reached a predetermined speed, the centrifugal force acting on the weight $W^1$ overcomes the force exerted by the springs $K^1$ to hold the projection 134 in a notch 131 and a slot 132, the projection 134 being integral with weight $W^1$, and the eccentric $B^1$ and member $E^1$ are no longer locked together and the mechanism becomes potentially operative whereupon a driving connection may be established. The mechanism remains operative as long as this speed is maintained and also at a higher speed until a predetermined maximum higher speed of the driven shaft $D^2$ is attained at which time the centrifugal force acting on the weight $W^1$, causes the weight to overcome the resistance of the springs $K^1$ and move farther outward until the projection 133 of the yoke I fits into the other set of notches 131 and slots 132 of the hub 130 of the member $E^1$ and the eccentric $B^1$ respectively. The eccentric $B^1$ and member $E^1$ are locked together, and there can be no relative movement between the said eccentric and said member and the mechanism becomes inoperative. When the mechanism is inoperative the relation of the gears $G^2$ and $C^2$ are as disclosed in Fig. 12, gear $G^2$ can idle and the gears operate on their pitch circles.

It was pointed out in my Patent No. 2,444,530, that in the performance of any self propelled vehicle there existed at all times a series of reverse or negative torques and positive torques and that the frequency of the changing from a positive to negative and negative to positive torque became greater as the speed of the vehicle increased. The relative movement of the member $E^2$ and eccentric $B^1$ is small to cause a driving connection to be established or to be disrupted. When an automotive vehicle is running the occurrences of these positive and negative torques causes the pressure to be alternated from one side of the projections 133 and 134 to their other side when they are fitted into a set of notches 131 and slots 132 and this reversing of pressure facilitates their moving out of the notches 131 and slots 132 when a predetermined speed of the driven shaft $D^2$ is attained to cause the mechanism to be operative. Also these positive and negative torques facilitate the moving of projection 133 of the yoke I into a set of the notches 131 and slots 132, when the maximum predetermined speed of driven shaft $D^2$ is attained to cause the mechanism to be inoperative.

Referring to the drawings, Figs. 17, 18, 19, 20 and 21 disclose a speed-shifting mechanism for the high speed of a step-speed power transmission for an automotive vehicle. The salient difference of this shifting mechanism comparable to the ones just described is that there must be embodied in it a definite hold back mechanism or in other words there must be a mechanism to prevent at all times the driven shaft from running faster than the driving shaft which would be at the speed of the motor.

A gear 140 (see Fig. 18) is integral with a shaft directly connected with the motor which will be more fully explained and understood from the description of a complete step-speed transmission that follows. Ball bearing 141 is conventionally held in receptacle 142 in gear 140. The extreme end of driven shaft $D^3$ is conventionally journaled in ball bearing 141. Hollow driving shaft $A^3$ has projections 143 which fit into slots 144 in the inner end of gear 140 and the driving force is transmitted from gear 140 to driving shaft $A^3$ in this manner. Driving shaft $A^3$ is mounted on driven shaft $D^3$ and is free to rotate about said shaft on needle bearings 101' entailing the usual conventional construction.

Gear $C^3$ is integral with the driving shaft $A^3$ and meshes with gear $G^3$ mounted on fixed shaft 105' integral with member E³ and free to rotate about fixed shaft 105' on needle bearings 106' entailing the usual conventional construction. A collar 107' fits on the outer end of fixed shaft 105' and is held in place by a tapered pin 108', which pierces both the fixed shaft 105' and collar 107'. One end of gear G³ movably abuts the inside surface of collar 107' and the other end of gear G³ movably abuts the face of boss 109' of the member E³. Member E³ is mounted on and free to rotate about eccentric B². Eccentric B² is loosely splined on driven shaft D³ in the manner as shown in Fig. 21.

Gear C³ integral with driving shaft A³ also meshes with gear G⁴ mounted on fixed shaft 105'' integral with the member E⁴ and is free to rotate about shaft 105'' on needle bearings 106'' entailing the usual conventional construction. A collar 107'' fits on the outer end of fixed shaft 105'' and is held in place by a tapered pin 108'', which pierces both the fixed shaft 105'' and collar 107''. One end of gear G⁴ movably abuts the inside surface of collar 107'' and the other end of gear G⁴ movably abuts the face of boss 109'' of the member E⁴. Member E⁴ is mounted on an eccentric B³ splined on shaft D³ in splines 110' as shown in Fig. 20 and is free to rotate about the eccentric B³.

The splined portion of driven shaft D³ loosely pierces holes 114' and 114'' in members E³ and E⁴ and one end of eccentric B² and eccentric B³ movably abuts the faces of bosses shown in broken lines, integral with members E³ and E⁴ and encircling holes 114' and 114'' respectively. Counter balancing weight 112' is integral with member E³.

The face of boss 111'' of member E⁴ movably abuts the inner end of driving shaft A³ and the face of boss 111' of member E³ movably abuts one end of eccentric B³. One end of eccentric B² abuts the inner end of collar 115'' splined to driven shaft D³ in splines 110'. Arms 116'' are integral with collar 115'' and extend toward the driving end of the mechanism and arms 113'' are integral with member E³. Springs R² under suitable compression have their seats in circular recesses (not shown) in arms 113'' and 116'' of the member E³ and collar 115'' respectively. Ears 145 are integral with member E⁴ and are adapted to contact arms 116'' and limit the movement of the member E⁴ in one direction about the eccentric B³.

Rods 119', slidably fit into holes 146 in weights W², fit tightly in holes 123' in arms 116'' integral with the collar 115'' and are held fast in holes 123' by tapered pins 147 which pierce the arms 116'' and the rods 119'. Springs K² fit loosely into holes 148 in the weights W² and are conventionally fastened to the collar 115'' at one of their ends and terminate in hooks at the other of their ends which fit over rods 149 that fit into partially semi-circular grooves 150 in weights W². Rods 149 have heads on their ends which prevent their longitudinal movements in either direction in the grooves 150. Rods 119' have heads on one of their ends that fit into counter bores 151 of the holes 146 in weights W² and the inner surfaces of these heads are adapted to contact the bottoms of counter bores 151 and limit the outward movements of the weights W². A projection 134' on the side of one of the weights W² is adapted to fit into a notch 131' whose sides slope inwardly toward each other, located in the hub 130' in member E³ and also into a slot 132' rectangular in section and cut into the eccentric B² (see Figs. 18 and 21) and lock the hub 130' and eccentric B² so there can be no relative movement between them.

The performance of the high-speed shifting mechanism cannot be operative until a predetermined speed of the automotive vehicle has been attained and continues operative as long as the vehicle maintains a speed above the predetermined speed. Also the driven shaft D³ can never rotate faster than the driving shaft A³. Otherwise the performance is the same as the shifting mechanism immediately heretofore described.

When the driven shaft D³ has attained substantially the predetermined speed, weights W² due to centrifugal force acting on them move outwardly against the spring tension of springs K², projection 134' moves out of notch 131' of hub 130' and slot 132' of the eccentric B², member E³ and eccentric B³ may have relative movement and the mechanism is potentially operative whereupon a driving connection may be established. If the speed of the driven shaft D³ decreases substantially below the predetermined speed, the centrifugal force acting on weights W² cannot overcome the spring tension of springs K², the springs draw the weights W² inwardly, projection 134' integral with one of the weights W² enters notch 131' and slot 132', and there can be no relative movement of member E³ and eccentric B², the mechanism is inoperative and a driving connection cannot be established.

Assuming that the driving shaft A³ and driven shaft D³ rotate in the same direction and that shaft D³ is rotating in a clockwise direction, as viewed in Fig. 17, then also as viewed in Figs. 20 and 21 the shaft D³ would be rotating in a clockwise direction. But as viewed in Fig. 19 the driving shaft A³ would be rotating in a counterclockwise direction. It will be seen by the inspection of Fig. 20 that if the driven shaft D³ rotates in a clockwise direction, whether the mechanism is operative or inoperative, that if driven shaft D³ should attempt to rotate faster than gear C³ or faster than the motor was running, that the eccentric B³ splined to driven shaft D³ would cause gear G⁴ through the member E⁴ to be pulled inwardly, and there would be a lockup of gears G⁴ and gear C³ and shaft D³ could not rotate faster than gear C³ which rotates at the speed of the motor. Again viewing Fig. 20 it will be seen that if member E⁴ should attempt to rotate about eccentric B³ in a counterclockwise direction to cause a lockup of gears G⁴ and C³, it would not be permitted to rotate in this direction as the ears 145 would contact arms 116'' and the relative positions of the parts would be as disclosed in Fig. 20.

The following is the description of a low speed shifting mechanism which also functions as an automatic clutch, replacing the main clutch which is usually located between the motor and the transmission. Since one view of this low speed mechanism and automatic clutch is shown installed in a step-speed transmission the driven shaft is now the floating shaft of the transmission and is designated by the reference character F (see Figs. 22, 23, 24 and 25). Gear 155 is keyed to the hollow driving shaft A⁴ by key and keyways 156 (see Fig. 25). A split ring 157 fits into a counter bore in the hub of gear 155 and movably abuts the collar 115 of the intermediate shifting mechanism Y. Hollow driving shaft A⁴ is mounted on floating shaft F and is free to rotate on needle bearings 158 and 159 (see Figs. 22 and 25). One side of gear 155, opposite the side of its counter bore abuts a ring 160, which in turn abuts the inner ring of ball bearing 161. Ball bearing 161 is conventionally held in receptacle 162 in the front end of the auxiliary housing P of the transmission. Hollow driving shaft $A^4$ is journaled in ball bearing 161.

Eccentric $B^4$ is integral with driving shaft $A^4$. Member $E^5$ is mounted on the said eccentric $B^4$ and is free to rotate thereon. One end of member $E^5$ movably abuts the side of an enlarged portion 163 of driving shaft $A^4$. The other end of member $E^5$ movably abuts the side of a split plate 164, having the same eccentricity as the eccentric $B^4$. Split plate 164 fits on a smooth portion of floating shaft F, and has a circular disc portion 165 that fits into a counter bore in the eccentric $B^4$ and the other side of the said plate abuts splines 166 on floating shaft F (see Fig. 22). Counter balancing weight 112'' is integral with member $E^5$.

A gear $C^4$ is tightly splined on floating shaft F on splines 166, one end of gear $C^4$ abuts a side of the split plate 164 and the other end of the said gear abuts an end of clutch member 167. Gear $C^4$ meshes with gear $G^5$ mounted on needle bearings 168 on fixed shaft 169 integral with member $E^5$. A collar 170 fits on the end of fixed shaft 169 and is held in place by a tapered pin 171 which pierces both the collar 170 and the shaft 169. One side of gear $G^5$ movably abuts a face of the movable member $E^5$ and the other end of gear $G^5$ movably abuts the inner side of collar 170.

Rods 119'' fit tightly in holes in arms 172, which are integral with hollow driving shaft $A^4$ and are held in place by tapered pins 173' which pierce both the rods 119'' and the arms 172. Weights $W^3$ and $W^4$ fit slidably over rods 119'' in suitable holes in the weights (see Fig. 24). Yoke $I^1$ is integral with weight $W^3$ and yoke $I^2$ is integral with weight $W^4$. Springs $K^3$ located in holes 148' in the weights $W^3$ and $W^4$ and holes 148'' in the arms 172 are under a predetermined tension and their ends terminate in hooks which fit around grooves in rods 149' that fit into partially semicircular grooves 150' in the weights $W^3$ and $W^4$ (see Figs. 22, 23 and 24). Tapered holes 173 in the hub 130'' of the member $E^5$ and spherical shaped holes 174 in the eccentric $B^4$ are adapted to receive pins 175 formed to fit the said holes when they register with each other. Pins 175 have cylindrical portions smaller than the greatest diameter of their tapered portion, that are pressed fit into suitable holes in the weight $W^3$ and the yoke $I^1$ which is integral with weight $W^3$ (see Fig. 24).

In order to have the low speed shifting mechanism function both as a clutch and shifting mechanism it is obvious that the parts must be made heavier, since the speed of its driving shaft would be much slower than the motor speed and the weights $W^3$ and $W^4$ must be heavier. Before the starting of the motor the relation of the parts of the mechanism to each other are as disclosed in Fig. 24. Pin 175 in weight $W^3$ (shown in broken lines) fits into tapered hole 173 in the hub 130'' of member $E^5$ and into spherical shaped hole 174 in the eccentric $B^4$, thus locking the member $E^5$ and eccentric $B^4$ together, there can be no relative movement between them, the mechanism is inoperative and a driving connection cannot be established.

When the driving shaft $A^4$ of the mechanism attains a predetermined speed, the centrifugal force acting on the weights $W^3$ and $W^4$ overcome the tension of springs $K^3$, the weights move outwardly and the pin 175 attached to weight $W^3$ moves out of the tapered hole 173 and spherical shaped hole 174, and there can be relative movement of the eccentric $B^4$ and member $E^5$ and the mechanism is potentially operative whereupon a driving connection may be established. While the motor was increasing in speed to cause the driving shaft $A^4$ to attain the predetermined speed, gears $C^2$ and $C^3$ were meshing with gears $G^2$ and $G^3$ respectively and were imparting some driving force to floating shaft F through members $E^2$ and $E^3$ through eccentrics $B^1$ and $B^2$ respectively (see Figs. 14 and 18). Also gear $G^5$ meshing with gear $C^4$ was imparting some driving force to gear $C^4$. As the speed of the motor increased the driving force imparted to floating shaft F due to the meshing of the gears just described also increased and a drive was imparted to floating shaft F analogous to the driving force imparted by a slipping clutch, which was pointed out in the description of the performance of the clutches described in the early part of this specification thus facilitating gradual easy starting of the vehicle.

After shaft $A^4$ has attained the predetermined speed, at which time the mechanism is potentially operative whereupon a driving connection may be established, eccentric $B^4$ integral with driving shaft $A^4$ moves relative to member $E^5$ and causes gear $G^5$ to be drawn inwardly and a lockup is established between gears $G^5$ and $C^4$ splined to floating shaft F on splines 166 and the floating shaft F is positively driven through the low shifting speed mechanism.

Floating shaft F will continue to be driven through the low speed shifting mechanism as long as the speed of driving shaft $A^4$ maintains the predetermined speed and until a higher predetermined speed of shaft $A^4$ is attained. At the higher predetermined speed, the centrifugal force acting on the weights $W^3$ and $W^4$ has caused them to overcome the tension of springs $K^3$ and arrive at the outwardmost point of their travel. Yoke $I^1$ integral with weight $W^3$ has been drawn inward until pin 175 attached to yoke $I^1$ has entered into a tapered hole 173 in the hub 130'' of member $E^5$ and spherical shaped hole 174 in the eccentric $B^4$, member $E^5$ and eccentric $B^4$ are locked together, they can have no relative movement, the mechanism is inoperative and a driving connection can not be established. The mechanism will remain inoperative as long as the speed of driving shaft $A^4$ is higher than, or at, the higher predetermined speed.

When the speed of driving shaft $A^4$ decreases below the higher predetermined speed, the weights $W^3$ and $W^4$ move inwardly, since the springs $K^3$ exert a greater pull on the weights than the centrifugal force acting on the weights can exert. Yokes $I^1$ and $I^2$ move outwardly when weights $W^3$ and $W^4$ move inwardly, as yokes $I^1$ and $I^2$ are integral with weights $W^3$ and $W^4$ respectively. As yoke $I^1$ moves out, pin 175 attached to it moves out of tapered hole 173 in the hub 130'' of member $E^5$ and spherical shaped hole 174 in eccentric $B^4$, and there can be relative movement of member $E^5$ and eccentric $B^4$ and the mechanism is operative, and driving shaft $A^4$ through the low speed shifting mechanism can drive floating shaft F. Driving shaft $A^4$ will continue to drive floating shaft F until the speed of shaft $A^4$ has decreased to the low predetermined speed at which time the springs $K^3$ have pulled the weights $W^3$ and $W^4$ to the inwardmost point of their travel and pin 175 attached to weight $W^3$ has entered the tapered hole 173 in the hub 130'' and spherical shaped hole 174 in the eccentric $B^4$. Under the conditions just described the mechanism becomes inoperative and a driving connection cannot be established. It is obvious if the speed of shaft $A^4$ be decreased not to the predetermined low speed when the mechanism is operative, but increased after a certain amount of decrease in speed, if it continues to increase in speed until the higher predetermined speed is attained the mechanism would become inoperative by the same functioning of the parts as heretofore described in detail. The pins 175 moving into and out of tapered holes 173 and spherical shaped holes 174 is greatly facilitated by the characteristic of the changing from positive to negative torque and negative to a positive torque in the performance of an automotive vehicle which has been explained heretofore.

A ball bearing 176 conventionally held in receptacle 177 in clutch member 167 journals the inner end of tail shaft T of the transmission. The end of a smooth portion 178 of tail shaft T, larger than the portion of the said tail shaft which fits into the ball bearing 176 abuts one end of the inner ring of ball bearing 176. One side of spring ring 179, which fits into an annular groove 180 in tail shaft T, abuts the ends of splines 181 of tail shaft T and its other side abuts one end of the inner ring of ball bearing 182. Ball bearing 182 is conventionally held in receptacle 183 in the auxiliary housing P and journals tail shaft T. Conventionally fastened to the outer end of tail shaft T is an adaptor 184 which is adapted to be connected to the propeller shaft of the vehicle. A conventional ring 185 to prevent the leakage of lubricant fits onto the smallest cylindrical portion 186 of the adapter 184 and is conventionally held in an annular recess in the auxiliary housing P.

Gear 187, which is the first of the reverse gear train, is integral with clutch member 167 and meshes with gear 188. A shaft journaled in a suitable journal integral with housing P (shaft and journal not shown), has rotatively attached to one of its ends gear 188 and has rotatively attached at its other end gear 189. The drive imparted by gear 187 to 188 is transmitted by gear 188 through the said shaft to gear 189. Gear 189 meshes with an idler gear 190 which rotates about a shaft suitably held in the auxiliary housing P (the shaft not shown). The inner surface of head 191 of the said shaft is movably abutted by one end of idler gear 190 and the other end of gear 190 movably abuts the face of boss 192 integral with the auxiliary housing P.

A clutch member 193 is slidably splined on tail shaft T on splines 181. A gear 194 is integral with clutch member 193 and is adapted to mesh with idler gear 190. Teeth 195 of clutch member 193 are adapted to engage teeth 196 of clutch member 167 splined to floating shaft F in splines 166. An annular groove 197 in clutch member 193 receives shifting fingers 198.

Aperture 199 in auxiliary housing P has a cover plate 200 fastened to auxiliary housing P by bolts 201 threaded in said housing. Conventional lock washers are located under the heads of bolts 201 to prevent them from turning when tightened. An annular projection 202 of auxiliary housing P fits into an annular recess 203 in the main housing Q. One set of bolts 204 fit into holes 205 in main housing Q and are threaded in holes 206 in the auxiliary housing P. Another set of bolts 207 fit into holes 208 in auxiliary housing P and and threaded in holes 209 in the main housing Q. Conventional lock washers are located under the heads of all the bolts to prevent them from turning when tightened. When bolts 204 and 207 are tightened in their threads annular projection 202 of the auxiliary housing P fits tight into annular recess 203 of the main housing Q and the faces of said housing abut each other under pressure. Aperture 210 in the main housing Q has a cover plate 211 fastened to main housing Q by bolts 212 threaded in the main housing.

A longitudinal section through a portion of a step-speed transmission is shown in Fig. 25 and embodies a high speed shifting mechanism X which has been described, and disclosed in Figs. 17, 18, 19, 20 and 21 of the drawings and also embodies an intermediate speed shifting mechanism Y which has been described, and disclosed in Figs. 10, 11, 12, 13, 14, 15 and 16.

Driving shaft S connecting the motor with high speed shifting mechanism X is journaled in ball bearing 213 conventionally held in receptacle 214 in the front end of the main housing Q. A counter shaft V at one of its ends is journaled in a ball bearing 215 conventionally held in receptacle 216 in the end of the main housing Q and is journaled at its other end in ball bearing 217 conventionally held in receptacle 218 in the front end of auxiliary housing P. Gears 219, 220 and 221 are integral with the counter shaft V. Gear 140 integral with the driving shaft S meshes with gear 219 of the counter shaft V and the drive from the motor is transmitted through gears 140 and 219 to the counter shaft V. The drive is transmitted from the counter shaft V to the shifting mechanism Y by gear 220 meshing with gear 99 which is keyed to driving shaft $A^2$ of the intermediate speed shifting mechanism Y. Gear 221 of the counter shaft V meshes with gear 155 which is keyed to the driving shaft $A^4$ of the combination low speed shifting mechanism and automatic clutch Z.

The following is a description of the performance of the step-speed transmission as disclosed in Figs. 22 and 25, all the shifting mechanisms X, Y and Z being both torque and centrifugally controlled. Assume the motor is running at a slow speed causing shaft $A^4$ of shifting mechanism Z to be rotating at a speed below the predetermined speed at which shifting mechanism Z becomes operative. Relative positions of the clutch members 167 and 193 in Fig. 22 discloses that the transmission is in neutral. In order to have the motor drive the tail shaft T and propel the automotive vehicle forward if the transmission be installed in an automotive vehicle, the motor is assumed to be running in a counter clockwise direction as viewed toward the broken end of driving shaft S, the shifting fingers 198, by any conventional means, must be moved forward carrying clutch member 193 with them until the teeth 195 of clutch member 193 engages correctly teeth 196 of clutch member 167. The speed of the motor now being reasonably gradually increased, the meshing of gears $C^2$ and $C^3$ with gears $G^2$ and $G^3$ respectively, as gears $C^2$ and $C^3$ would be rotating faster than shifting mechanisms Y and X, would be rotating bodily and the meshing of gear $G^5$ with gear $C^4$ as the mechanism Z would be rotating faster bodily than gear $C^4$ which is substantially at rest, and would cause a slipping clutch action afore described. When the speed of the motor through gear 140, gear 219 counter shaft V gears 221 and 155 would be such as to cause driving shaft $A^4$ to attain the predetermined speed required to cause shifting mechanism Z to be operative, there would be a lockup of gears $G^5$ and $C^4$ and the floating shaft F and tail shaft T, now connected to gear 187 would be driven through low speed shifting mechanism Z.

If the motor speed continued to increase, the driving shaft $A^4$ of shifting mechanism Z through the gearing just described will be increased to the higher predetermined speed at which time the shifting mechanism Z will become inoperative. It being so timed, by proportioning the weight $W^1$ and spring $K^1$ of the shifting mechanism Y, that just before shifting mechanism Z became inoperative, due to driving shaft $A^4$ attaining the higher predetermined speed, shifting mechanism Y became potentially operative and a driving connection could be established. With the average driving there will be a reverse torque and the speed of shifting mechanism Y rotating bodily will be sufficiently near synchronism with the speed of gear $C^2$ integral with driving shaft $A^2$, that springs $R^1$ will permit a lockup of gears $G^2$ and $C^2$, the details of how these lockups occur have been described several times heretofore in this specification, and after this lockup of gears $G^2$ and $C^2$ floating shaft F will be driven through shifting mechanism Y and in turn drive tail shaft T.

If the motor speed now be continued to increase, the weight $W^1$ of speed shifting mechanism Y, due to centrifugal force, will be moved farther outwardly until the projection 133 of the yoke I being pulled inwardly fits into notch 131 of the hub 130 of the member $E^2$ and slot 132 of the eccentric $B^1$ and the shifting mechanism Y becomes inoperative (see Figs. 13, 14 and 25). With the average driving a reverse torque will again occur and floating shaft F will attempt to rotate faster than driving shaft $A^3$ of shifting mechanism X is rotating, driving shaft $A^3$ being rotatively attached to gear 140 as afore described and gear 140 being integral with shaft S directly connected with the motor. Just before the shifting mechanism Y became inoperative, it being so timed by proportioning of the springs $K^2$ and weights $W^2$, the weights $W^2$ due to centrifugal force had moved outwardly until the projection 134' integral with one of the weights $W^2$, had moved with its weight $W^2$ out of notch 131' of hub 130' of member $E^3$ and out of slot 132' of the eccentric $B^2$ and mechanism X became potentially operative and a driving connection could be established (see Figs. 17, 18, 21 and 25). Floating shaft F cannot rotate faster than driving shaft $A^3$ as eccentric $B^3$ tightly splined to floating shaft F in splines 110' will rotate in a clockwise direction as viewing Fig. 20 and cause member $E^4$ to move inwardly, pull gear $G^4$ inwardly and there will be a lockup between gear $G^4$ and gear $C^3$, which is integral with driving shaft $A^3$. At the same time collar 115" tightly splined to floating shaft F in splines 110', through its arms 116" and springs $R^2$ drove member $E^3$ in a clockwise direction, as viewing Fig. 20, gear $G^3$ was pulled inwardly and a lockup was established of gears $G^3$ and $C^3$ and the mechanism X has driving connections between driving shaft $A^3$ and floating shaft F for shaft $A^3$ to drive floating shaft F and for floating shaft F to drive driving shaft $A^3$ in the direction the motor is rotating. As long as the speed of the motor is maintained sufficiently high, that the floating shaft F maintains a speed so that weights $W^2$ remain out at a point that projection 134' does not enter notch 131' and slot 132' (see Figs. 18, 21 and 25), floating shaft F will be driven at the speed of the motor.

If the speed of the motor be reduced, either by demand of the vehicle performance or manually slowing down by closing the throttle, to a point where the centrifugal force acting on weights $W^2$ cannot overcome the tension of the springs $K^2$ so that the projection 134' enters the notch 131' and slot 132' the shifting mechanism X becomes inoperative and the driving shaft $A^3$ can no longer drive floating shaft F but floating shaft F can always drive driving shaft $A^3$ in the direction of the drive if the floating shaft F rotates faster than driving shaft $A^3$ as there will be a lockup of the gears $G^4$ and $C^3$ which has been described heretofore (see Figs. 19 and 20).

Just before the motor had slowed down sufficiently to cause the shifting mechanism X to become inoperative as just described, the floating shaft F had slowed down so that weight $W^1$ of the shifting mechanism Y had moved inwardly and the projection 133 of yoke I had moved out of notch 131 and slot 132 of the hub 130 of the member $E^2$ and eccentric $B^1$ of the shifting mechanism Y and shifting mechanism Y became potentially operative and a driving connection could be established (see Figs. 13, 14 and 25). When the shifting mechanism X became inoperative the motor increased its speed slightly and the speed of the driving shaft $A^2$ of the shifting mechanism Y and the speed of floating shaft F became sufficiently near synchronism that there was a lockup of the gears $G^2$ and $C^2$, the eccentric $B^1$ being driven in a counter-clockwise direction by the relative movement of floating shaft F in a counter-clockwise direction relative to member $E^2$ as viewing Fig. 10 and the floating shaft F is driven through gears 140 and 219, counter shaft V, gears 220 and 99, driving shaft $A^2$ and through the shifting mechanism Y (see Figs. 13, 14 and 25).

The floating shaft F will be driven through the gearing just described and shifting mechanism Y until the speed of the floating shaft F decreases to a speed where the weight $W^1$ acted on by centrifugal force cannot overcome the spring tension of springs $K^1$, the weight $W^1$ moves inwardly and projection 134 integral with weight $W^1$ moves into the notch 132 and slot 131 of the movable member $E^2$ and eccentric $B^1$ the shifting mechanism Y becomes inoperative and floating shaft F will be driven through the shifting mechanism Z, which will be more fully explained in the following.

But if while the drive is through shifting mechanism Y, the motor speed is increased, thereby increasing the speed of floating shaft F to a speed where the centrifugal force acting on the weight $W^1$ causes the weight $W^1$ to move outwardly against the tension springs $K^1$ until the projection 133 of yoke I moves into notch 131 of the hub 130 of the member $E^2$ and slot 131 of eccentric $B^1$, the shifting mechanism Y becomes inoperative and the floating shaft F will be driven through shifting mechanism X. The details of this performance has been described heretofore.

Just before the speed of floating shaft F had decreased to a point where the shifting mechanism Y became inoperative as just immediately heretofore described, weights $W^3$ and $W^4$, of shifting mechanism Z, on account of the centrifugal force acting on them being no longer sufficient to overcome the tension of springs $K^3$, had moved inwardly until the pin 175 attached to the yoke $I^1$, integral with weight $W^3$, which moves outward when weight $W^3$ moves inwardly, had moved out of tapered hole 173, in the hub 130'' of member $E^5$ and spherical hole 174 of the eccentric $B^4$ and the shifting mechanism Z had become potentially operative and a driving connection could be established (see Figs. 22, 23 and 24). In the same manner as the speed of the floating shaft F and driving shaft $A^2$ of the shifting mechanism Y became sufficiently near synchronism to cause a lockup of gear $G^2$ and $C^2$, when the shifting mechanism X became inoperative, as just described, so now driving shaft $A^4$ of the shifting mechanism Z and the floating shaft F are sufficiently near synchronism that there is a lockup of gear $G^5$ and gear $C^4$ of the shifting mechanism Z and the floating shaft F is driven through shifting mechanism Z. If the motor speed is not increased, the drive will continue through gear 140 and gear 219, counter shaft V, gears 221 and 155, driving shaft $A^4$ and through the shifting mechanism Z to drive floating shaft F. If the speed of the motor be decreased to a predetermined idling speed weights $W^3$ and $W^4$ will be drawn farther inwardly to their furthermost point inwardly, as the weights $W^3$ and $W^4$ are so proportioned in respect to springs $K^3$, pin 175 attached to the weight $W^3$ will enter tapered hole 173 and spherical hole 174, the shifting mechanism Z will become inoperative, the details of this performance have been described heretofore, and there will be no positive drive between the motor through any of the shifting mechanisms X, Y and Z and the floating shaft F. If the motor is run near or at the top idling speed there will be the equivalent of a slipping-clutch as a driving force will be imparted to the floating shaft F by the meshing of gears $C^3$ and $G^3$, $C^2$ and $G^2$ and $C^4$ and $G^5$ which has been described heretofore.

In the foregoing description of the performance of the step-speed transmission, the expression "average driving" was employed in this description. When the shifting of the speeds are from a lower to a higher speed, there must be a reverse torque or in other words floating shaft F must rotate as fast or attempt to rotate faster than the driving shaft of the next speed higher than the one it just previously had been driven through in order that the floating shaft F and the said driving shaft be sufficiently near synchronism that a driving connection may be established as has been explained. It is natural with operators to permit their foot to dwell on the throttle or actually ease up on the throttle in the operating of manually speed shifting transmissions of all types, and this easing up or dwelling of the throttle is necessary in the driving of this transmission in shifting from a lower to a higher speed, that is what is intended to be the meaning of the expression "average driving." However, the shifting mechanisms that are both torque and centrifugally controlled, in shifting from a higher to a lower speed will operate with or without the dwell of the throttle.

It will be obvious from the foregoing that both torque and centrifugally controlled and only torque controlled shifting mechanisms are an elaboration of the two-way overriding mechanism disclosed in Figs. 1, 2, 3 and 4. Springs $R^1$ and $R^2$ function similarly as springs R in the device disclosed in Figs. 8 and 9 and heretofore described; in that when floating shaft F is sufficiently out of synchronism with driving shafts $A^2$ and $A^3$ that whether the gears $C^2$ and $C^3$ are rotating faster than gears $G^2$ and $G^3$ respectively or gears $G^2$ and $G^3$ are being carried around gears $C^2$ and $C^3$ respectively faster than gear $C^2$ and $C^3$ are rotating, there can be no driving connection established, until there is a near proximity of synchronism of the floating shaft F and one or the other of shafts $A^2$ and $A^3$. The tension which springs $R^1$ and $R^2$ are under determining that proximity and they also provide the slipping device performance to secure easy and gradual starting of the vehicle and in this last function they perform exactly like springs R in the construction disclosed in Figs. 8 and 9. Also these springs $R^1$ and $R^2$ function to make the transmission selective by the manipulation of the throttle. In any type of vehicle in which this transmission is installed, if it be operating in any of the speeds other than high speed, if the operator opens the throttle to secure a high road speed for any speed in which the vehicle is operating, then close the throttle quickly a reverse torque will be had due to the road speed of the vehicle, such that the floating shaft F will be rotating so much faster comparable to even one or more driving shafts $A^2$, if the transmission had several intermediate speed shifting mechanisms, that the springs $R^1$ would be compressed and the floating shaft F would not drive member $E^2$ through the springs $R^1$ in the direction the floating shaft F was rotating to cause a driving connection to be established through that speed mechanism, but the driving connection would be established in a higher speed mechanism in which a driving shaft $A^2$ or even $A^3$ would be rotating nearer the speed of the floating shaft F. For example: in the three speed transmission disclosed in the drawings, if installed in an automotive vehicle, and operating through the low speed shifting mechanism Z if the throttle was opened wide and a higher road speed than usual be given the vehicle, then the throttle be closed quickly, the transmission could be caused to perform in the high speed shifting mechanism X, since the floating shaft F would have to synchronize in this speed because there would be a locking up of gears $G^4$ and $C^3$ to prevent the floating shaft F from rotating faster than driving shaft $A^3$, it being understood that the throttle must be opened again in a reasonable time to cause the speed of the motor to be adequate for the shifting mechanism X to be operative.

Likewise this transmission performing such that the drive was through any shifting mechanism other than the low speed shifting mechanism, can be caused to operate through a lower speed mechanism by a reasonably slow closing of the throttle and then opening it quickly. This causes a very low frequency of first a reverse or negative torque then a positive torque. Again springs $R^1$ or $R^2$ would be compressed, the floating shaft F would not drive member $E^2$ or member $E^3$ in the direction it was rotating to cause a driving connection to be made in the speed shifting mechanism through which the floating shaft was being driven before the just described manipulation of the throttle and the drive would be established in a lower speed shifting mechanism.

If any type of vehicle equipped with an internal combustion engine be also equipped with this transmission and is being driven through any speed other than the low speed shifting mechanism, the transmission will not permit the engine to stall, because at the stalling point of the engine there always occurs a series of negative and positive torques of low frequency, similar to the low frequency negative and positive torques manually secured as just described. When negative and positive torques occur of low frequency the drive will be had through a lower speed shifting mechanism. The value of these positive and negative torques of low frequency can be experienced in the plate clutch type passenger automotive vehicle, when attempting to start the vehicle in high speed from a standstill. Under such conditions the vehicle will have a series of jerky motions and in most cases the engine will stall.

To reverse the directions of the rotation of tail shaft T to drive a vehicle backward in which the transmission is installed, a conventional construction is employed (see Fig. 22). Fingers 198 are moved by any conventional manually operated means to cause clutch member 193 slidably splined to tail shaft T in splines 181 to be moved to the right as viewing Fig. 22 and gear 194 integral with clutch member 193 is caused to mesh with idler gear 190. This reverse train of gears has been described in the foregoing.

Since this transmission is more particularly intended for self-propelled rail-cars, army-tanks, heavy trucks and busses, in which expert operators are employed the following described design is the intention of the applicant. An automatic device of the form disclosed in Figs. 5, 6 and 7 and described in this specification would be located between the motor and the transmission itself. This device is a form of construction of applicant's pending application, Serial No. 671,089, filed May 20, 1946. The shifting mechanisms of the transmission would be torque controlled only. All intermediate shifting mechanism would be as disclosed in Figs. 10, 11 and 12. The high speed shifting mechanism would be the same as that disclosed in Figs. 10, 11 and 12 and have added to it a definite hold back speed mechanism as is disclosed in Figs. 18, 19 and 20, consisting of eccentric B³ tightly splined to floating shaft F, member E⁴ mounted on eccentric B³ and having ears 145 integral with it and adapted to contact arms 116″ to prevent its rotation in one direction about the eccentric B³ and having a gear G⁴ adapted to lockup with gear C³, thereby insuring that the floating shaft F under all conditions of the performance of the transmission can never rotate faster than the motor is rotating. A two-way overriding mechanism such as is disclosed in Figs. 1, 2, 3 and 4 would comprise the low speed shifting mechanism. Since the low speed shifting mechanism is the only shifting mechanism in which its eccentric is attached to its driving shaft, which is driven through gearing and the counter shaft by a gear rotatively attached to the main driving shaft of the transmission, when the main driving shaft of the transmission would start to rotate, eccentric B⁴ would rotate (see Fig. 22) and a lockup of gears G⁵ and C⁴ would be established to cause the drive to be through the low speed mechanism to drive the floating shaft F. Floating shaft F, at the start of the rotation of the main driving shaft of the transmission would always be driven first through the low speed shifting mechanism if only for an instant.

The manually operated mechanism for the purpose of securing forward, neutral and reverse driving connections would be located between the floating shaft F and the tail shaft T of the transmission. Clutches would be employed in this mechanism that could be engaged or disengaged practically as easily under load as under no load. A clutch which has these characteristics and manually operated is disclosed in the applicant's pending application for patent Serial No. 671,089, filed May 20, 1946.

In this purely torque controlled transmission, as it has been pointed out in the foregoing, the operator can shift from one speed to another by manipulation of the throttle. If it is desired to shift from a lower speed to a higher one, the throttle is closed quickly and opened reasonably gradually. If it is desired to shift from a higher speed to a lower one, the throttle is reasonably slowly closed and quickly opened. Also it has been pointed out that if the transmission be operating through any of the shifting speed mechanisms, that if the load becomes too great to cause the motor to slow down to the stalling point, the transmission automatically shifts to a lower speed and will not permit the motor to stall, because of the occurrence of a series of negative and positive torques of low frequency, a natural characteristic of the performance of an internal combustion engine at the stalling point in an automotive vehicle.

In the foregoing it has been described how the operator by manipulation of the throttle can shift from a lower speed to a higher and from a higher to a lower one. If the operator would require the motor to operate as a brake, this can be done in any speed shifting mechanism through which the drive is operating by reasonably gradually closing the throttle and the hold back lockup of the gears will be established and remain established until the throttle is opened again sufficiently to cause the motor to take over the driving. With this design of transmission just described, a selective step-speed transmission is had with as many different gear ratios as may be required, having as many speeds backward as forward and all speed shifting is accomplished readily and easily by the manipulation of the throttle controlling the speed of the engine.

I claim:

1. A mechanism having a driving and a driven element rotatable about a common axis of rotation, a gear rotatively attached to one of the elements, a member carried by the other element adapted to rotate about an axis of rotation spaced from the common axis of rotation of the elements, a gear carried by the member functioning as a means to establish and disrupt the driving connection between the elements, adapted to mesh with the first said gear, to rotate about its own axis of rotation and rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of the said other element and resilient driving connections between the said other element and said member to rotate the member about its own axis of rotation, when the positive driving connection is inoperative and to maintain predetermined relative positions of the said other element and said member when the driving connection between the elements is disrupted.

2. A mechanism having a driving and a driven element rotatable about a common axis of rotation, a gear rotatively attached to one of the elements, a member carried by the other element adapted to rotate about an axis of rotation spaced from the common axis of rotation of the elements, a gear carried by said member functioning as a means to establish and disrupt the driving connection between the elements, adapted to mesh with the first said gear, to rotate about its own axis of rotation and rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of said other element, resilient driving connections between the said other element and said member to rotate the member about its own axis of rotation, when the said positive driving connection is inoperative and to maintain predetermined relative positions of the said other element and said member when the driving connection between the elements is disrupted, and a second member carried by said other element adapted to rotate about an axis of rotation spaced from the common axis of rotation of the elements, means to prevent the second member from rotating in one direction of rotation about its own axis of rotation, a gear carried by the second member functioning as a means to establish and disrupt a driving connection between the elements, adapted to mesh with the first said gear, to rotate about its own axis of rotation and rotate bodily about the axis of rotation of the second member.

3. In a step-speed power transmission in combination, a speed-shifting mechanism having a driving and a driven element rotatable about a common axis of rotation, a gear rotatively attached to one of the elements, a member carried by the other element adapted to rotate about an axis of rotation spaced from the common axis of rotation of the elements, a gear carried by said member functioning as a means to establish and disrupt the driving connection between the elements, adapted to mesh with the first said gear, to rotate about its own axis of rotation and to rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of the said other member, resilient driving connections between the said other element and said member to rotate the member about its own axis of rotation when the positive driving connection is inoperative and to maintain predetermined relative positions of the said other element and said member when the driving connection between elements is disrupted and means controlled by the speed of one of the elements for locking said member against rotation about its own axis of rotation until a predetermined speed of said one of the elements is attained.

4. In a step-speed power transmission in combination, a speed-shifting mechanism having a driving and driven element rotatable about a common axis of rotation, a gear rotatively attached to one of the elements, a member carried by the other element adapted to rotate about an axis of rotation spaced from the common axis of rotation of the elements, a gear carried by said member functioning as a means to establish and disrupt the driving connection between the elements, adapted to mesh with the first said gear, to rotate about its axis of rotation and rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of the said member, resilient driving connections between the said other element and said member to rotate the member about its own axis of rotation when the positive driving connection is inoperative and to maintain predetermined relative positions of the said other element and said member when the driving connection between the elements is disrupted, a second member carried by said other element adapted to rotate about an axis of rotation spaced from the common axis of rotation of the elements, means to prevent the second member from rotating in one direction of rotation about its own axis of rotation, a gear carried by the second member functioning as means to establish and disrupt a driving connection between the elements, adapted to mesh with the first said gear, rotate about its own axis of rotation and rotate bodily about the axis of rotation of said second member, and means controlled by the speed of one of the elements for locking said member against rotation about its own axis of rotation until a predetermined speed of said one of the elements is attained.

5. In a step-speed power transmission in combination, a speed-shifting mechanism having a driving and a driven element rotatable about a common axis of rotation, a gear rotatively attached to one of the elements, a member carried by the other element adapted to rotate about an axis of rotation spaced from the common axis of rotation of the elements, a gear carried by said member functioning as a means to establish and disrupt the driving connection between the elements, adapted to mesh with the first said gear, to rotate about its own axis of rotation and to rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of the said other member, resilient driving connections between the said other element and said member to rotate the member about its own axis of rotation when the positive driving connection is inoperative and to maintain predetermined relative positions of the said other element and said member when the driving connection between elements is disrupted and means controlled by the speed of one of the elements for locking said member against rotation about its own axis of rotation prior to a predetermined speed and subsequently of another predetermined speed of said one of the elements.

6. In a step-speed power transmission in combination, a speed-shifting mechanism having a driving and a driven element rotatable about a common axis of rotation, a gear rotatively attached to one of the elements, a member carried by the other element adapted to rotate about an axis of rotation spaced from the common axis of rotation of the elements, a gear carried by said member functioning as a means to establish and disrupt the driving connection between the elements, adapted to mesh with the first said gear, to rotate about its axis of rotation and rotate bodily about the axis of rotation of said member, means to permit a predetermined limited amount of rotation of the axis of rotation of said member about the common axis of rotation of the elements, a positive driving connection between the said other element and said member to rotate the member about its own axis of rotation, means to permit the positive driving connection to be inoperative at times for a predetermined part of a revolution of the said other member, resilient driving connections between the said other element and said member to rotate the member about its own axis of rotation when the positive driving connection is inoperative and to maintain predetermined relative positions of the said other element and said member when the driving connection between the elements is disrupted, a second member carried by said other element adapted to rotate about an axis of rotation spaced from the common axis of rotation of the elements, means to prevent the second member from rotating in one direction of rotation about its own axis of rotation, a gear carried by the second member functioning as means to establish and disrupt a driving connection between the elements, adapted to mesh with the first said gear, rotate about its own axis of rotation and rotate bodily about the axis of rotation of said second member and means controlled by the speed of one of the elements for locking said member against rotation about its own axis of rotation prior to a predetermined speed and subsequently of another predetermined speed of said one of the elements.

7. In a step-speed power transmission in combination, a speed-shifting mechanism having a driving element and a driven element rotatable about a common axis of rotation, a gear rotatively attached to one of the elements, an eccentric rotatively attached to the other element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric.

8. In a step-speed power transmission in combination, a speed-shifting mechanism having a driving element and a driven element rotatable about a common axis of rotation, a gear rotatively attached to one of the elements, an eccentric rotatively attached to the other element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric and means controlled by the speed of one of the elements for locking said member against rotation about the eccentric until a predetermined speed of said one of the elements is attained.

9. In a step-speed power transmission in combination, a speed-shifting mechanism having a driving element and a driven element rotatable about a common axis of rotation, a gear rotatively attached to one of the elements, an eccentric rotatively attached to the other element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric and means controlled by the speed of one of the elements for locking said member against rotation about the eccentric prior to a predetermined speed and subsequently of another predetermined speed of said one of the elements.

10. In a step-speed power transmission in combination, a speed-shifting mechanism having a driving and a driven element rotatable about a common axis of rotation, a gear rotatively attached to one of the elements, an eccentric loosely splined on the other element for limited rotational movement relative thereto, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric and resilient driving connections between the said other element and said member adapted to rotate the member about the eccentric and to maintain in predetermined relative positions the said other element and said member when the driving connection between the elements is disrupted.

11. In a step-speed power transmission in combination, a speed-shifting mechanism having a driving and a driven element rotatable about a common axis of rotation, a gear rotatively attached to one of the elements, an eccentric loosely splined on the other element for limited rotational movement relative thereto, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric, resilient driving connections between the said other element and said member adapted to rotate the member about the eccentric and to maintain in predetermined relative positions the said other element and said member when the driving connection between the elements is disrupted and means controlled by the speed of one of the elements for locking said member against rotation about the eccentric until a predetermined speed of said one of the elements is attained.

12. In a step-speed power transmission in combination, a speed-shifting mechanism having a driving element and a driven element rotatable about a common axis of rotation, a gear rotatively attached to one of the elements, an eccentric loosely splined on the other element for limited rotational movement thereto, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric, resilient driving connections between the said other element and said member adapted to rotate the member about the eccentric and to maintain in predetermined relative positions the said other element and said member when the driving connection between the elements is disrupted, a second eccentric rotatively attached to the said other element, a second member mounted on and free to rotate a limited amount about the second eccentric, means to prevent the second member from rotating in one direction of rotation about the second eccentric, a gear carried by the second member functioning as a means to establish and disrupt a driving connection between the elements, meshing with the first said gear, rotatable about its own axis of rotation and bodily rotatable about the second eccentric.

13. In a step-speed power transmission in combination, a speed-shifting mechanism having a driving element and a driven element rotatable about a common axis of rotation, a gear rotatively attached to the driven element, an eccentric rotatively attached to the driving element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric.

14. In a step-speed power transmission in combination, a speed-shifting mechanism having a driving element and a driven element rotatable about a common axis of rotation, a gear rotatively attached to the driven element, an eccentric rotatively attached to the driving element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric and means controlled by the speed of the driving element for locking the said member against rotation about the eccentric until a predetermined speed of the driven element is attained.

15. In a step-speed power transmission in combination, a speed-shifting mechanism having a driving element and a driven element rotatable about a common axis of rotation, a gear rotatively attached to the driven element, an eccentric rotatively attached to the driving element, a member mounted on and free to rotate a limited amount about the eccentric, a gear carried by said member functioning as a means to establish and disrupt the driving connection between the elements, meshing with the first said gear, rotatable about its own axis of rotation and bodily rotatable about the eccentric and means controlled by the speed of the driving element for locking the said member against rotation about the eccentric prior to a predetermined speed and subsequently of another predetermined speed of the driving element.

References Cited in the file of this patent

UNITED STATES PATENTS

| Number | Name | Date |
|---|---|---|
| 1,950,163 | Cotterman | Mar. 6, 1934 |
| 1,985,127 | Wemp | Dec. 18, 1934 |
| 2,407,099 | Richards | Sept. 3, 1946 |